under_stands_United States Patent Office 3,338,875
Patented Aug. 29, 1967

3,338,875
HYDROXYLATED SULFUR-CONJUGATED DIENE POLYMERS
Albert J. Costanza, Akron, and Arthur H. Weinstein, Hudson, Ohio, assignors to The Goodyear Tire & Rubber Company, Akron, Ohio, a corporation of Ohio
No Drawing. Filed Dec. 9, 1963, Ser. No. 329,291
9 Claims. (Cl. 260—79)

This invention relates to a hydrocarbon sulfur copolymer which has terminal hydroxyls. More specifically, it relates to a liquid hydrocarbon sulfur copolymer possessing hydroxyl terminals which result from the chemical reaction of a 1,2-epoxy compound with the mercaptan group of a liquid or liquifiable hydrocarbon sulfur copolymer. This latter copolymer is obtained by the hydrogenolitic cleavage of a high molecular weight copolymer of sulfur and at least one conjugated diene or of a conjugated diene and a mono-alpha-olefin.

The copolymer of sulfur and a conjugated diene per se or of sulfur, a conjugated diene and a monolefin can be represented by the following sulfur-hydrocarbon general formula:

where M is a monomer unit derived from a conjugated diene having from 4 to about 8 carbon atoms, for example, butadiene, isophene, ethyl butadiene, propyl butadiene, and pentadiene-1,3, and a mono-alpha-olefin having from 2 to about 20 carbon atoms, for example, acrylonitrile, styrene and those listed hereinafter, S is sulfur, $a$, $b$ and $y$ are integers having values from 1 to 100 or more and with the sum of $a$, $b$ and $y$ being sufficient to give a molecule having a molecular weight of at least about 50 to 100 thousand, and $x$ and $t$ being integers having values of 0 to 8, with the proviso that when $x$ and $t$ are zero, then the M groups are joined to each other.

The hydrogenolitic cleaved $M_a(S_xM_b)_yS_t$ polymer may be represented by the following formula:

where M is a monomer unit obtained from a conjugated diene having from 4 to 8 carbon atoms and an alpha-olefin having from 2 to 20 carbon atoms, $p$, $q$ and $k$ are integers having values of 1 and higher with the sum of $p$, $q$ and $k$ being less than those values which give the cleaved mercaptan terminated polymer a molecular weight greater than about 10,000.

The cleaved product obtained by the hydrogenolysis of the copolymers of sulfur with a conjugated diene or a mixture of conjugated dienes with a mono-alpha-olefin are unstable and malodorous. Since the cleaved product contains ethylenic double bonds the mercaptan groups tend to react with the unsaturation to destory or kill the mercaptan group and this tendency becomes particularly deleterious during storage. Destruction of the active mercaptan groups of the cleaved polymer is indeed an unfortunate occurrence as the cleaved polymers of the molecular weight obtained by the hydrogenolysis of the copolymers of sulfur and a conjugated diene are liquids or liquifiable and thus could be utilized in a liquid casting system for the preparation of various objects or as potting compounds.

An object of this invention is to provide hydroxyl terminated liquid polmers containing some sulfur atoms interspersed within the backbone of the largely hydrocarbon polymer and thus provide a method for utilizing readily available starting materials such as the conjugated dienes in preparing intermediates useful in a liquid casting or potting operation.

The objects of this invention are accomplished by taking the cleaved product obtained by the hydrogenolysis of the copolymer of sulfur with a conjugated diene either alone or in conjunction with a mono-alpha-olefin and reacting the cleaved product with a 1,2-epoxy compound to yield a product which has either a primary or a secondary hydroxyl group on the end of the polymer chain. Thus, this method permits a hydrocarbon polymer containing some sulfur atoms interspersed within the carbon-to-carbon chain to be hydroxylated through the thiol groups of the cleaved polymer.

These hydroxylated polymers can be represented by the formula:

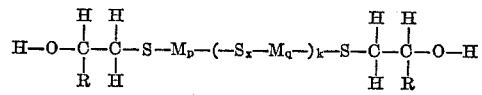

where $p$, $q$, $k$ and $x$ have the values indicated on page 1 and R is hydrogen or an alkyl radical having from 1 to about 20 carbon atoms. The term 1,2-epoxy compounds are used synonymously with vicinal and is not limited to terminal epoxy groups. They are divided into two groups, the saturated epoxy monomers which may be of an aliphatic or aromatic nature and the unsaturated epoxy aliphatic monomers.

Representative examples of the saturated epoxy monomers are the aliphatic compounds: ethylene oxide, propylene oxide-1,2, butylene oxide-1,2, butylene oxide-2,3, the amylene oxides and related alkylene oxides containing from 2 to about 20 carbon atoms and of the aromatic compounds: styrene oxide and the oxide of vinyl toluene. Representative examples of the epoxy alkyl alkylene ethers are epoxy octylyl octylene ether, styryl glycidyl ether, vinyl glycidyl ether and allyl glycidyl ether.

Normally it is found to be expedient to use at least a catalytic amount and up to about one-tenth of a mol percent of an alkaline material such as the alkali hydroxides or amines as a catalyst to promote the reaction between the epoxy compound and the mercaptan group of the mercaptan terminated polymer.

Cleavage of the copolymers of sulfur and at least one diene is achieved by treating this copolymer with a solvent to cause the copolymer to swell and then treating the swollen polymer with a hydrogenolysis cleaving agent such as the alkali aluminum hydrides or a combination of metallic zinc and hydrogen chloride. The hydrogenolysis cleaving agent cleaves the sulfur-to-sulfur bonds in the groups of sulfur atoms in the polymer backbone to yield a polymeric product of lower molecular weight, usually about 500 to 10,000 and preferably 1,000 to 5,000. This lower molecular weight polymer also contains at least two mercapto groups per molecule, some monosulfide sulfur in the carbon-to-carbon chain of the cleaved polymer molecule and at least one double bond. The cleaved liquid polymers of this invention have viscosities at 25° C. of from about 20,000 to 100,000 centipoises or higher. The cleaved liquid polymer will contain at least one carbon-to-carbon double bond for each 1,000 units of molecular weight. Where the cleaved copolymer is one of sulfur and isoprene, the number of carbon-to-carbon double bonds for each 1,000 grams of polymer may be as high as about 14, but the cleaved sulfur-butadiene copolymer may even have as many as about 17 carbon-to-carbon double bonds per 1000 grams of polymer.

The rubbery copolymers of dienes, such as butadiene and isoprene, with sulfur are well known and may be prepared by emulsion polymerization with free radical polymerization initiators such as benzoyl peroxide or the well known polymerization catalyst ingredient potassium persulfate, which generically are referred to herein as peroxy initiators. The treatment of the copolymer of sulfur and a diene either as a latex or a dry solid with a suitable solvent and a suitable hydrogenolysis cleaving agent cleaves the sulfur-to-sulfur bonds to yield polymer segments having terminal mercaptan groups. Alternately the latex can be treated to coagulate the polymer and then the coagulated polymer can be cleaved while still wet or after it has been dried provided the proper cleaving agent is used.

The present invention may be more fully understood from the following illustrative examples representative of the many combinations of diene monomers and mono-alpha-olefins with sulfur which can be used to produce the cleaved polymers of this invention. The parts and percentages are by weight unless otherwise designated.

EXAMPLE I

*Preparation of sulfur containing polymer*

A typical polymerization recipe was as follows:

| | Parts by weight |
|---|---|
| Water | 200 |
| Fatty alcohol sodium sulfate | 4 |
| Potassium persulfate | 0.4 |
| Tetrasodium ethylene diamine tetra-acetate | 0.9 |
| Isooctyl phenoxy polyethoxy ethanol non-ionic emulsifier | 2 |
| KCl | 1 |
| Hydrochloric acid (conc) | 0.13 |
| Sulfur | Variable |
| Isoprene | 100 |
| Hydroquinone (shortstop) | 0.15 |

Sulfur, in the form of a 35% dispersion in water, was charged after the reactor had been sealed and just prior to charging the isoprene. The reactor temperature at the start of the polymerization was 139° F. and then gradually was raised to 150° F. in 5° steps, during the first two hours of the polymerization. The shortstop was added after the desired conversion had been reached.

The latices listed below were made at the sulfur level indicated with the above recipe and procedure. The shortstop was added at the indicated conversion.

Latex 8014—Total sulfur, 4.75 parts, one-half charged initially and remainder charged at about 25% conversion. Final conversion, 70%.

Latex 8098—Total sulfur, 2 parts, charged initially. Final conversion, 65%.

Latex 8140—Total sulfur, 2 parts, charged initially. Final conversion, 25%.

Latex 8257—Total sulfur, 3.99 parts, 1.33 parts charged initially and 1.33 parts charged at both 20 and 40% conversion. Final conversion, 65%.

EXAMPLE II

*Cleaving the polymer without isolating from latex*

Latex 8257, containing 100 grams of polymer was placed in a 3-liter Erlenmeyer flask equipped with a mechanically driven agitator. After starting the agitator, the following ingredients were added:

| | | |
|---|---|---|
| Ditertiary butyl hydroquinone | gm | 1 |
| Benzene | ml | 1000 |
| Zinc dust | gm | 50 |
| Isopropanol | ml | 500 |

After 15 minutes agitation, 150 ml. of concentrated HCl was added incrementally during a period of one hour. Agitation was continued for one hour after the last addition of HCl. The reaction mixture was permitted to stand until it separated into two nearly clear liquid layers with some dark residue on the bottom of the flask. The upper layer, benzene solution containing the cleaved polymer, was separated and treated with a quantity of anhydrous sodium sulfate to remove dissolved water. Another gram of ditertiary-butyl hydroquinone, the stabilizer, was added to the benzene solution containing the cleaved polymer. Then the benzene was evaporated from the solution at room temperature under a vacuum to obtain 85 grams of the cleaved liquid polymer.

Analysis of the cleaved liquid polymer indicated 4.42% by weight of mercaptan sulfur in the polymer. Another portion of this latex was coagulated by isopropanol and the dried polymer cleaved with lithium aluminum hydride yielding a liquid polymer, which contained 4.4% mercaptan sulfur.

EXAMPLE III

*Cleaving the wet coagulum containing dispersed zinc dust*

Zinc dust, 50 grams, was stirred into Latex 8257 which contained 100 grams of polymer. Sufficient isopropanol was added to the latex to coagulate it. The serum was decanted and the coagulum was pressed to squeeze out the readily removable serum. The wet coagulum was broken into small lumps and added to 1000 ml. of benzene in a 2-liter Erlenmeyer flask equipped with a mechanically driven agitator. After 15 minutes stirring 1 gram of ditertiary-butyl hydroquinone was added to the benzene dispersion of the swollen polymer. Concentrated HCl (150 ml.) was added incrementally to the flask. Since the polymer was already wet with isopropanol from the coagulation step, more polar solvent was not required. From this point, the procedure was the same as described in Example II. The cleaved polymer contained 4.30% mercaptan sulfur.

EXAMPLE IV

The polymer used in this example was formed by the copolymerization of the ingredients of a recipe containing by weight about 75 parts butadiene, 25 parts styrene and 3.6 parts sulfur with the polymerization being carried to about 70% conversion. This polymer, after coagulation of the latex and drying the washed coagulate, was first extracted for 3 days with acetone in a Soxhlet extractor. The original polymer contained 4.62% sulfur and after the acetone extraction the polymer was found to contain 3.72% by weight of combined sulfur. The extracted polymer (3 parts) was then treated with dry toluene (100 parts) and the mixture was allowed to stand until the polymer exhibited appreciable swelling. A solution consisting of 15 parts of tetrahydrofuran and 0.5 parts of lithium aluminum hydride was added to the toluene containing the swollen polymer. The resulting mixture was shaken at frequent intervals and allowed to stand at room temperature. In a short time, about 10 minutes, a liquid phase appeared due to the cleaving of the swollen polymer. After the entire mixture became liquid sufficient ethyl alcohol was added slowly to the mixture to react with the total amount of lithium aluminum hydride present and thereby destroy the excess cleaving agent. The cleaved reaction mixture was acidified with HCl and then washed with sufficient water to remove alcohol and the other soluble components. The washed organic layer was filtered to remove any finely suspended lithium or aluminum salts. The solvent remaining in the organic phase was removed under a vacuum at room temperature. A typical analysis of the cleaved dry polymer showed the presence of 1.53% thiol sulfur and a total sulfur content of 2.23%.

EXAMPLE V

Dry polymer, 50 grams, obtained by coagulation of Latex 8140 with isopropanol, was swollen in 1000 ml. heptane in a 3-neck, 2-liter round bottom flask equipped with an agitator, a dropping funnel and maintained under a nitrogen atmosphere. A total of 150 ml. of a 3% by weight solution of $LiAlH_4$ in tetrahydrofuran, was added dropwise over a period of one hour, with the rate of addition being adjusted so that the temperature of the reaction mixture could be held below 35° C. After stirring another 10 minutes, the mixture was treated with alcohol, hydrochloric acid and washed with water as in Example IV. The liquid polymer remaining, after removing the solvent by vacuum evaporation at room temperature, had a mercaptan sulfur content of 3.6% and could be cured readily by the addition of lead peroxide.

EXAMPLE VI

Preparation of hydroxyl terminated polymer

A latex made by the recipe of Example I using five parts of sulfur and shortstopped at 50% conversion was cleaved according to the procedure of Example II. A portion of the cleaved product (52.2 parts of the cleaved polymer) while still dissolved in the benzene and isopropanol solution was placed in a bottle equipped with a screw cap containing a self-sealing rubber gasket. Then 3.5 parts of ethylene oxide (2 mols per chemical equivalent of mercaptan) and 0.3 parts of pyridine was added from a syringe to the bottle through the rubber gasket. The contents of the bottle were mixed by shaking and then the bottle was placed in a 50° C. oven for 72 hours. The bottle was removed from the oven and the contents were poured into a shallow flat pan and the pan was placed in a vacuum oven at 80° C. The pan was allowed to remain in the vcuum oven until the volatiles such as isopropanol and benzene had been removed. The residue remaining in the flat pan was found to be free of mercaptan odor and to give a negative test for mercaptans. A hydroxyl number determination on the liquid residue in the pan gave a hydroxyl equivalent weight of 1700 as compared to the theoretical value of 1760 for the polymer calculated from the mercaptan content. This ethylene oxide treated cleaved liquid polymer could be stored for long periods of time without loss of the active terminal groups.

This hydroxyl terminated liquid polymer (100 grams) was mixed with varying amounts of polyisocyanata A, produced by the phosgenation of a reaction product of aniline and formaldehyde and containing an average of three isocyanate groups per molecule with an equivalent weight of about 120. The mixtures of the hydroxyl terminated liquid polymer and polyisocyanate A were poured into ointment tins and cured at 150° F. for 22 hours.

The following physical test results were obtained on the cured sheets, with the amounts of polyisocyanate A used in making the elastomer serving to designate each of the elastomers: (0.5% triethylamine was used as a catalyst.)

| Polyiso-cyanate A,[1] grams used | Solubility in benzene, percent | S. V.[2] | 100% Modulus, p.s.i. | Elongation at break, percent | Tensile, p.s.i. |
|---|---|---|---|---|---|
| 9.9 | 39 | 18.3 | 27 | 640 | 29 |
| 11.0 | 17 | 11.2 | 67 | 330 | 164 |
| 12.0 | 16 | 9.6 | 101 | 220 | 113 |

[1] Parts by weight per 100 parts of polymer.
[2] S.V.=swelling volume of insoluble portion of vulcanizate. Volume of swollen material/volume of dry insoluble material.

Any of the organic isocyanates may be utilized in the process of this invention. Representative examples of the diisocyanates are ethylene, propylene, tetramethylene, pentamethylene, octamethylene, undecamethylene, dodecamethylene, and 3,3'-diisocyanate dipropylether; cyclopentylene - 1,3-diisocyanate, cyclohexylene-1,4-diisocyanate, 2,4-tolylene diisocyanate, 2,6-tolylene diisocyanate and mixtures of 2,4- and 2,6-tolylene diisocyanate, xylylene-1,4-diisocyanate, xylylene-1,3-diisocyanate, 4,4'-diphenylmethane diisocyanate, 2-nitrodiphenyl-4,4'-diisocyanate, 4,4'-diphenyl propane diisocyanate, p-isocyanato benzyl isocyanate, m-phenylene diisocyanate, p-phenylene diisocyanate, naphthylene-1,4-diisocyanate, 3,3'-dimethyl-4,4'-diphenylene-diisocyanate, furfurylidene diisocyanate. Other representative isocyanates are p,p'-p''-triphenyl methane triisocyanate and diphenyl-4,6,4'-triisocyanate and the phosgenation product of an aromatic amine and an aldehyde.

EXAMPLE VII

Hydroxyalkylation with propylene oxide

A liquid thiol terminated polyisoprene prepared by $LiAlH_4$ cleavage of a high molecular weight isoprene/sulfur copolymer was treated with propylene oxide in the following manner to convert it to a hydroxyl terminated polymer. The following ingredients were placed in a 1-ounce vial that could be sealed with a screw cap:

| | | |
|---|---|---|
| Thiol terminated liquid polymer | g | 2.3 |
| Benzene | ml | 15 |
| Alcoholic KOH, 0.43 N | ml | 2 |
| Propylene oxide | ml | 1 |

After thorough mixing, the air space in the vial was flushed with nitrogen to remove air. The vial was sealed, placed in an oven and heated at 50° C. for 18 hours. After the reaction mixture was made slightly acid with concentrated HCl, the organic phase was separated and placed in a vacuum oven at about 50° C. for evaporation of solvents. The liquid non-volatile polymeric residue was free of mercaptan and analysis indicated a hydroxyl equivalent of 1000. This hydroxyl terminated polymer could be stored without loss of hydroxyl number and then could be reacted with an excess toluene diisocyanate to produce an elastomer.

EXAMPLE VIII

Hydroxyalkylation with $C_{16}$–$C_{18}$ olefin oxide

A liquid thiol terminated polyisoprene was prepared according to the procedure described in Examples 1 and 2. The cement or solution of the cleaved polymer from this step was placed in a vacuum oven at about 30° C. to remove all the solvent by evaporation. The liquid polymeric residue having a mercaptan equivalent weight of 837 was mixed with one equivalent of a $C_{16}$–$C_{18}$ olefin oxide per equivalent of mercaptan and 3 percent by weight of 2,4,6-tri-(dimethylaminomethyl) phenol, as catalyst. The mixture was heated 16 hours at 95° C. at which time it was free of mercaptan odor. Some of the polymer was mixed with polyisocyanate A, one equivalent of isocyanate per equivalent of hydroxyl assuming quantitative reaction of the epoxide with the original mercaptan groups, and spread as a thin film and allowed to cure for 16 hours at 95° C. Tests on the cured film gave the following results:

| | |
|---|---|
| Tensile, p.s.i. | 180 |
| Elongation at break percent | 60 |
| Solubility percent | 10 |
| Swelling volume percent | 4.3 |

The copolymers of sulfur and dienes useful in the practice of this invention can be prepared from those dienes having conjugated double bonds and containing from 4 to 10 carbon atoms. Representative examples of the mono-alpha-olefins which can be copolymerized with sulfur and the dienes to give $M_a$ and $M_b$ groups of a heteric nature are styrene, acrylic acid, methacrylic acid, methyl acrylate, butyl acrylate, methyl methacrylate, acrylonitrile and methacrylonitrile and the related esters of acrylic and methacrylic acid. The preferred alpha olefins such as styrene and acrylonitrile contain from 2 to 12 carbon atoms.

The amount of the mono-alpha-olefin used to make the plastic or elastogenic sulfur copolymers cleavable in accordance with this invention varies rather broadly from as little as about 0.5 mol percent to as high as 95 mol percent of mono-alpha-olefins and higher. Generally the range of mono-alpha-olefins will be about 5 to 50 mol percent.

Some representative sulfur copolymers useful in this invention are those containing from 1 to 10% sulfur by weight made by copolymerization with the following olefinic materials:

A. Butadiene
B. 10–90% butadiene, 90–10% styrene
C. 10–90% butadiene, 90–10% acrylonitrile
D. Isoprene
E. 10–90% isoprene, 90–10% styrene
F. 10–90% isoprene, 90–10% acrylonitrile The solvents useful in this invention are those capable of swelling the sulfur copolymer, but are inert to the hydrogenolysis agents being used. When the zinc-hydrochloric acid combination is used it is necessary that some water be present so mixtures of solvents such as benzene and ethanol, toluene and isopropanol, toluene and ethanol, benzene and acetic acid or xylene and ethanol are required. When lithium aluminum hydride is used it is necessary to operate under anhydrous conditions and in the absence of compounds possessing active hydrogens such as alcohols and acids. Aromatic solvents such as benzene and toluene, etc., as well as aliphatic solvents such as hexane, heptane, cyclohexane, etc. may be used for swelling the polymer. Ethers such as tetrahydrofuran, diethylether may be used to dissolve the lithium aluminum hydride so it may be added to the swollen polymer conveniently as a solution. The preferred solvents are heptane for swelling the polymer and tetrahydrofuran for dissolving the lithium aluminum hydride.

When the hydrogenolysis cleaving agent is a mixture of finely divided zinc metal and hydrogen chloride or the acid, the solvents usually contain at least about 5% and preferably about 15 to 40% by weight of the water soluble alcohols or the water soluble carboxylic acids dissolved in an aromatic hydrocarbon, halogenated hydrocarbon or an ether of the type indicated hereinbefore.

The cleavage with lithium aluminum hydride is highly exothermic and occurs spontaneously at room temperature. Also, it is necessary to use the lithium aluminum hydride in essentially anhydrous conditions. Therefore it is desirable in some instances to use some cooling and maintain a temperature from about 0° C. to 50° C. Use of the other alkali aluminum hydrides requires the use of similar temperature conditions. Since mixtures of finely divided zinc and hydrogen chloride are not nearly as exothermic as lithium aluminum hydride, there is less need for cooling or controlling the temperature during the cleavage step.

While certain representative embodiments and details have been shown for the purpose of illustrating the invention, it will be apparent to those skilled in this art that various changes and modifications may be made therein without departing from the spirit or scope of the invention.

What is claimed is:
1. A compound having the formula

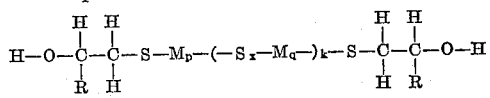

where R is hydrogen, alkyl from 1 to about 20 carbon atoms, phenyl, and tolyl, M is a monomer unit derived from a conjugated diolefin having from 4 to about 8 carbon atoms and a mono-alpha-olefin having from 2 to 20 carbon atoms, $p$, $q$, and $k$ are integers having values of at least one and their sum is sufficient to give the compound a molecular weight of about 500 to about 10,000, and $x$ is an integer having values from 0 to 8, with the proviso that when $x$ is zero, then the M groups are joined to each other but $x$ has a value in some repeating units to give some sulfur interspersed in the carbon to carbon chain of said compound.

2. The product of claim 1 wherein R is H.
3. The product of claim 1 wherein R is methyl.
4. The product of claim 1 wherein M is derived from butadiene.
5. The product of claim 1 wherein M is derived from isoprene.
6. The product of claim 1 wherein from about 5 to 50 mol percent of the M units are derived from a mono-alpha-olefin and the remaining M units are derived from the conjugated dienes.
7. The process for making a compound having the formula

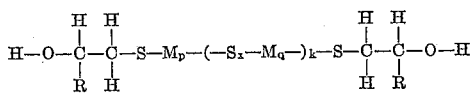

comprising the steps of
(1) cleaving a polymer having the formula

where M is a monomer unit derived from the group consisting of the conjugated diene having from 4 to about 8 carbon atoms and mono-alpha-olefins having from 2 to about 20 carbon atoms; $a$, $b$ and $y$ are integers having values of at least 1 and their sum being sufficient to give a molecule having a molecular weight of at least about 50,000, and $x$ and $t$ are integers having values of 0 to 8, with the proviso that when $x$ is zero, then the M groups are joined to each other, but $x$ has a value in some repeating units to give some sulfur interspersed in the carbon to carbon chain of said compounds, with a cleaving agent selected from the class consisting of lithium aluminum hydride and the combination of zinc and a non-oxidizing mineral acid, and (2) reacting about 50 to 95° C. the cleaved product with a reactant selected from the class of aliphatic, aromatic, and unsaturated 1,2-epoxy compound.

8. The process of claim 7 where the 1,2-epoxy compound is an alkylene oxide.
9. The process of claim 7 wherein the polymer is swelled in a suitable solvent prior to treatment with a cleaving agent selected from the class consisting of lithium aluminum hydride and an aqueous mixture of zinc and a nonoxidizing mineral acid and then treating the cleaved polymer with a 1,2-epoxy compound in the presence of a basic material selected from the alkali hydroxide and amines.

References Cited
UNITED STATES PATENTS

| | | | |
|---|---|---|---|
| 2,216,044 | 9/1940 | Patrick | 260—79 |
| 2,731,437 | 1/1956 | Bender et al. | 260—79.1 |
| 2,787,608 | 4/1957 | Gregory et al. | 260—79.1 |
| 2,849,416 | 8/1958 | Binder et al. | 260—79.1 |
| 3,047,544 | 7/1962 | Byrd | 260—79 |

DONALD E. CZAJA, *Primary Examiner.*

LEON J. BERCOVITZ, *Examiner.*

M. I. MARQUIS, *Assistant Examiner.*